United States Patent
Xie

(10) Patent No.: US 11,258,698 B2
(45) Date of Patent: Feb. 22, 2022

(54) MULTICAST FORWARDING METHOD AND RELATED DEVICE

(71) Applicant: Huawei Technologies Co., Ltd., Shenzhen (CN)

(72) Inventor: Jingrong Xie, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 100 days.

(21) Appl. No.: 16/739,588

(22) Filed: Jan. 10, 2020

(65) Prior Publication Data

US 2020/0153728 A1 May 14, 2020

Related U.S. Application Data

(63) Continuation of application No. PCT/CN2018/075610, filed on Feb. 7, 2018.

(30) Foreign Application Priority Data

Jul. 11, 2017 (CN) .......................... 201710563820.5

(51) Int. Cl.
*H04L 12/761* (2013.01)
*H04L 45/16* (2022.01)
(Continued)

(52) U.S. Cl.
CPC .......... *H04L 45/16* (2013.01); *H04L 12/4633* (2013.01); *H04L 45/50* (2013.01)

(58) Field of Classification Search
CPC ..... H04L 45/16; H04L 12/4633; H04L 45/50; H04L 12/18; H04L 12/189; H04W 4/06
See application file for complete search history.

(56) References Cited

U.S. PATENT DOCUMENTS

| | | | |
|---|---|---|---|
| 9,432,205 B2 | 8/2016 | Tian et al. | |
| 2015/0078378 A1* | 3/2015 | Wijnands | H04L 12/18 370/390 |

(Continued)

FOREIGN PATENT DOCUMENTS

| | | |
|---|---|---|
| CN | 105763411 A | 7/2016 |
| CN | 106161260 A | 11/2016 |

(Continued)

OTHER PUBLICATIONS

Machine Translation and Abstract of Chinese Publication No. CN105763411, Jul. 13, 2016, 29 pages.
(Continued)

*Primary Examiner* — Peter P Chau
(74) *Attorney, Agent, or Firm* — Conley Rose, P.C.

(57) ABSTRACT

A multicast forwarding method applied to a BIER multicast network includes establishing, by a head node device, a first tunnel; generating a first entry; obtaining bit string information of a first multicast stream, where the bit string information includes an identifier of a tail node device that the first multicast stream is expected to reach; determining whether first bit string map information includes the identifier, in the bit string information, of the tail node device that the first multicast stream is expected to reach; and forwarding, by the head node device, the first multicast stream to a first intermediate node device through the first tunnel when the head node device determines that the first bit string map information includes the identifier in the bit string information, of the tail node device that the first multicast stream is expected to reach.

14 Claims, 9 Drawing Sheets

(51) Int. Cl.
*H04L 12/46* (2006.01)
*H04L 45/50* (2022.01)

(56) References Cited

U.S. PATENT DOCUMENTS

| | | | |
|---|---|---|---|
| 2015/0085635 A1* | 3/2015 | Wijnands | H04L 45/16 370/216 |
| 2015/0131659 A1 | 5/2015 | Wijnands et al. | |
| 2016/0119159 A1 | 4/2016 | Zhao et al. | |
| 2016/0127139 A1* | 5/2016 | Tian | H04L 12/185 370/390 |
| 2016/0127142 A1* | 5/2016 | Tian | H04L 12/1886 370/390 |
| 2016/0134518 A1* | 5/2016 | Callon | H04L 45/54 370/390 |
| 2016/0134535 A1* | 5/2016 | Callon | H04L 45/48 370/390 |
| 2016/0191372 A1* | 6/2016 | Zhang | H04L 49/201 370/390 |
| 2018/0205636 A1* | 7/2018 | Hu | H04L 45/16 |
| 2018/0278522 A1* | 9/2018 | Asati | H04L 45/64 |
| 2018/0287934 A1* | 10/2018 | Wang | H04L 12/4625 |
| 2018/0316520 A1* | 11/2018 | Wijnands | H04L 45/745 |
| 2018/0367456 A1* | 12/2018 | Wijnands | H04L 12/1854 |

FOREIGN PATENT DOCUMENTS

| | | |
|---|---|---|
| CN | 106603406 A | 4/2017 |
| CN | 106817308 A | 6/2017 |
| WO | 2017141076 A1 | 8/2017 |

OTHER PUBLICATIONS

Machine Translation and Abstract of Chinese Publication No. CN106161260, Nov. 23, 2016, 26 pages.
Machine Translation and Abstract of Chinese Publication No. CN106603406, Apr. 26, 2017, 18 pages.
Machine Translation and Abstract of Chinese Publication No. CN106817308, Jun. 9, 2017, 73 pages.
Eckert, T., et al., "Traffic Engineering for Bit Index Explicit Replication BIER-TE," draft-eckert-bier-te-arch-04, Jul. 8, 2016, 28 pages.
Eckert, T., et al., "Fast ReRoute (FRR) Extensions for BIER-TE," draft-eckert-bier-te-frr-00, Jul. 8, 2016, 10 pages.
Wijnands, IJ., Ed., et al., "Multicast using Bit Index Explicit Replication," draft-ietf-bier-architecture-05, Oct. 28, 2016, 36 pages.
Wijnands, IJ., Ed., et al., "Encapsulation for Bit Index Explicit Replication in MPLS Networks," draft-ietf-bier-mpls-encapsulation-05, Jul. 8, 2016, 15 pages.
Wijnands, IJ., Ed., et al., "Encapsulation for Bit Index Explicit Replication in MPLS and non-MPLS Networks," draft-ietf-bier-mpls-encapsulation-06, Dec. 9, 2016, 20 pages.
Rosen, E., Ed., et al., "Multicast VPN Using BIER," draft-ietf-bier-mvpn-05, Jan. 10, 2017, 13 pages.
Wijnands, IJ., Ed., et al., "Multicast using Bit Index Explicit Replication," draft-ietf-bier-architecture-06, Internet Engineering Task Force, Apr. 24, 2017, 36 pages.
Deering, S., "Host Extensions for IP Multicasting," RFC 988, Jul. 1986, 20 pages.
Deering, S., "Host Extensions for IP Multicasting," RFC 1112, Aug. 1989, 17 pages.
Rosen, E., et al., "MPLS Label Stack Encoding," RFC 3032, Jan. 2001, 23 pages.
Aggarwal, R., et al., "MPLS Upstream Label Assignment and Context-Specific Label Space," RFC 5331, Aug. 2008, 13 pages.
Eckert, T., et al., "MPLS Multicast Encapsulations," RFC 5332, Aug. 2008, 11 pages.
Rosen, E., Ed. et al., "Multicast in MPLS/BGP IP VPNs," RFC 6513, Feb. 2012, 88 pages.
Aggarwal, R., et al., "BGP Encodings and Procedures for Multicast in MPLS/BGP IP VPNs," RFC 6514, Feb. 2012, 59 pages.
Bidgoli, H., Ed., et al., "PIM Tunneling Through BIER Core," draft-hfa-bier-pim-tunneling-OO.txt, XP015120241, Jun. 22, 2017, 11 pages.
Wijnands, IJ, Ed., et al., "Multicast using Bit Index Explicit Replication," draft-ietf-bier-architecture-06.txt, XP015119304, Apr. 24, 2017, 36 pages.

\* cited by examiner

UPE1

| BFR-id | F-BM | BFR-NBR |
|---|---|---|
| R1 (00000001) | 00000001 | R1 |
| R2 (00000010) | 00000010 | R2 |
| R3 (00000100) | 00000100 | R3 |
| R254 (00001000) | 00001000 | R4 |
| R255 (00010000) | 00111111 | NPE 1 |
| R256 (00100000) | 00111111 | NPE 1 |

UPE2

| BFR-id | F-BM | BFR-NBR |
|---|---|---|
| R1 (00000001) | 00000001 | R1 |
| R2 (00000010) | 00000010 | R2 |
| R3 (00000100) | 00000100 | R3 |
| R254 (00001000) | 00001000 | R254 |
| R255 (00010000) | 00111111 | NPE 2 |
| R256 (00100000) | 00111111 | NPE 2 |

NPE1

| BFR-id | F-BM | BFR-NBR |
|---|---|---|
| R1 (00000001) | 00001111 | UPE 1 |
| R2 (00000010) | 00001111 | UPE 1 |
| R3 (00000100) | 00001111 | UPE 1 |
| R254 (00001000) | 00001111 | UPE 1 |
| R255 (00010000) | 00110000 | R5 |
| R256 (00100000) | 00110000 | R5 |

NPE2

| BFR-id | F-BM | BFR-NBR |
|---|---|---|
| R1 (00000001) | 00001111 | UPE 2 |
| R2 (00000010) | 00001111 | UPE 2 |
| R3 (00000100) | 00001111 | UPE 2 |
| R254 (00001000) | 00001111 | UPE 2 |
| R255 (00010000) | 00110000 | R256 |
| R256 (00100000) | 00110000 | R256 |

R255

| BFR-id | F-BM | BFR-NBR |
|---|---|---|
| R1 (00000001) | 00001111 | NPE 1 |
| R2 (00000010) | 00001111 | NPE 1 |
| R3 (00000100) | 00001111 | NPE 1 |
| R254 (00001000) | 00001111 | NPE 1 |
| R255 (00010000) | 00010000 | R5 |
| R256 (00100000) | 00100000 | R6 |

R256

| BFR-id | F-BM | BFR-NBR |
|---|---|---|
| R1 (00000001) | 00001111 | NPE 2 |
| R2 (00000010) | 00001111 | NPE 2 |
| R3 (00000100) | 00001111 | NPE 2 |
| R254 (00001000) | 00001111 | NPE 2 |
| R255 (00010000) | 00010000 | R255 |
| R256 (00100000) | 00100000 | R256 |

FIG. 1

MULTICAST FORWARDING METHOD AND RELATED DEVICE

CROSS-REFERENCE TO RELATED APPLICATIONS

This application is a continuation application of International Patent Application No. PCT/CN2018/075610, filed on Feb. 7, 2018, which claims priority to Chinese Patent Application No. 201710563820.5, filed on Jul. 11, 2017. The disclosures of the aforementioned applications are hereby incorporated by reference in their entireties.

TECHNICAL FIELD

This application relates to the field of wireless communications technologies, and in particular, to a multicast forwarding method and a related device.

BACKGROUND

Through multicast, one node may simultaneously send data to a plurality of nodes in a group, to reduce network bandwidth. For example, as shown in FIG. 6, a multicast network includes a head node device R255, intermediate node devices R256, NPE 1, NPE 2, UPE 1, and UPE 2, and tail node devices R1, R2, R3, and R254. If there are N multicast streams, and each multicast stream needs to be sent from the head node device R255 to some or all of the tail node devices R1, the tail node device R2, . . . , and the tail node device R254, a point to multipoint (P2MP) forwarding tree needs to be established for each multicast stream, and the following combinations of forwarding trees may exist, such as a P2MP forwarding tree for a multicast stream (S1, G1) is (R255→R1/R2), a P2MP forwarding tree for a multicast stream (S2, G2) is (R255→R1/R2/R3), and a P2MP forwarding tree for a multicast stream (S3, G2) is (R255→R1/R254). S is a multicast source and G is a multicast group.

Both the head node device and the intermediate node device store out label information and out interface information of the multicast stream (S1, G1).

Based on the P2MP forwarding tree, after the multicast stream (S1, G1) reaches the head node device R255, the head node device obtains the out interface information and the out label information that correspond to the multicast stream (S1, G1), and determines that a next hop node of the head node device R255 is the intermediate node device NPE 1. Out label information of the head node device R255 is in label information of the intermediate node device NPE 1, and the intermediate node device NPE 1 obtains corresponding out interface information and corresponding out label information based on the in label information, and determines that a next hop node of the intermediate node device NPE 1 is the intermediate node device UPE 1. The intermediate node UPE 1 determines out interface information and out label information based on in label information, and determines that the multicast stream (S1, G1) needs to reach the tail node device R1 and the tail node device R2. However, in a process of forwarding a multicast stream, each multicast stream needs one P2MP forwarding tree. Consequently, resource overheads of a node device are relatively large.

SUMMARY

Embodiments of this application provide a multicast forwarding method and a related device, applied to a bit index explicit replication (BIER) multicast network, to forward a plurality of multicast streams based on a tunnel established by a head node device from the head node device to a tail node device in order to help to reduce a quantity of established P2MP forwarding trees.

According to a first aspect, an embodiment of this application provides a multicast forwarding method. The method is applied to a BIER multicast network, the multicast network includes a head node device, an intermediate node device, and at least one tail node device, and the method includes the following.

First, the head node device establishes a first tunnel. A source node of the first tunnel is the head node device, a destination node of the first tunnel is the at least one tail node device, the first tunnel is used to forward a plurality of multicast streams, and the plurality of multicast streams include a first multicast stream. Then the head node device generates a first entry. The first entry includes first bit string map information, the first bit string map information includes an identifier of a first tail node device that is not directly connected to the head node device, and the at least one tail node device includes the first tail node device. Next, the head node device obtains bit string information of the first multicast stream, where the bit string information includes an identifier of a tail node device that the first multicast stream is expected to reach, and determines whether the first bit string map information includes the identifier, in the bit string information, of the tail node device that the first multicast stream is expected to reach. Finally, the head node device forwards the first multicast stream to a first intermediate node device through the first tunnel when the head node device determines that the first bit string map information includes the identifier, in the bit string information, of the node device that the first multicast stream is expected to reach. This helps to reduce a quantity of established P2MP forwarding trees in order to reduce resource overheads of the head node device. Moreover, a template tunnel can be shared, to keep that the plurality of multicast streams are replicated based on bit strings without bandwidth waste.

In a possible design, the head node device may obtain a first operation result based on the bit string information and the first bit string map information. A value of the first operation result is equal to a value obtained by performing a bitwise AND operation on the bit string information and the first bit string map information.

In another possible design, when a template tunnel includes a plurality of paths, the first entry further includes first out interface information and first out label information. The first out interface information is used to indicate a physical out interface of the head node device, and the first out label information is used to indicate the first tunnel. The head node device may determine, based on the first out interface information and the first out label information, the physical out interface indicated by the first out interface information, and send the first multicast stream through the first tunnel.

In another possible design, the head node device determines whether second bit string map information includes the identifier, in the bit string information, of the tail node device that the first multicast stream is expected to reach. The head node device forwards the first multicast stream to a second tail node device through the first tunnel when the head node device determines that the second bit string map information includes the identifier, in the bit string information, of the tail node device that the first multicast stream is expected to reach.

In another possible design, when the head node device determines that the first operation result is not 0, the head node device forwards the first multicast stream to the first intermediate node device through the first tunnel. When the head node device determines that the first operation result is 0, the head node device does not forward the first multicast stream to the first intermediate node device.

In another possible design, the head node device may obtain overlay information of a multicast stream and a table of a correspondence between a label switch router identifier (LSR-id) and a BIER forwarding router identifier (BFR-id). The overlay information includes address information of all tail node devices that the multicast stream is expected to reach. Then the head node device obtains bit string map information based on the overlay information and the table of the correspondence between an LSR-id and a BFR-id.

In another possible design, the head node device establishes a second tunnel using a second intermediate node device. A source node of the second tunnel is the head node device, a destination node of the second tunnel is the at least one tail node device, the second tunnel is used to forward the plurality of multicast streams, and the second tunnel includes a second multicast stream. When the head node device determines that bandwidth usage of the first tunnel is greater than a first threshold, the head node device forwards the second multicast stream through the second tunnel.

In another possible design, when the head node device determines that the bit string map information does not include the identifier, in the bit string information, of the tail node device that the first multicast stream is expected to reach, the head node device discards the first multicast stream.

According to a second aspect, an embodiment of this application provides a multicast forwarding method.

First, an intermediate node device receives, through a first tunnel, a first multicast stream sent by a head node device. A source node of the first tunnel is the head node device, a destination node of the first tunnel is at least one tail node device, the first tunnel is used to forward a plurality of multicast streams, the plurality of multicast streams include a first multicast stream. The intermediate node device generates a first entry. The first entry includes the anofirst bit string map information, and the first bit string map information includes an identifier of a first tail node device that is directly connected to the intermediate node device. Next, the intermediate node device obtains bit string information included in the first multicast stream, where the bit string information includes an identifier of a tail node device that the first multicast stream is expected to reach; and then determines whether the first bit string map information includes the identifier, in the bit string information, of the tail node device that the first multicast stream is expected to reach. Finally, the intermediate node device forwards the first multicast stream to the first tail node device through the first tunnel when the intermediate node device determines that the first bit string map information includes the identifier, in the bit string information, of the tail node device that the first multicast stream is expected to reach. This helps to reduce a quantity of established P2MP forwarding trees in order to reduce resource overheads of the intermediate node device. Moreover, a template tunnel can be shared, to keep that the plurality of multicast streams are replicated based on bit strings without bandwidth waste.

In a possible design, the intermediate node device obtains a first operation result based on the bit string information and the first bit string map information. A value of the first operation result is equal to a value obtained by performing a bitwise AND operation on the bit string information and the first bit string map information.

In another possible design, the first entry further includes first out interface information and first out label information, the first out interface information is used to indicate a physical out interface of the intermediate node device, and the first out label information is used to indicate the first tunnel. The intermediate node device determines, based on the first out interface information and the first out label information, the physical out interface indicated by the first out interface information, and sends the first multicast stream through the first tunnel.

In another possible design, the head node device further generates a second entry. The second entry includes second bit string map information, second out interface information, and second out label information, the second bit string map information includes an identifier of a second tail node device that is directly connected to the intermediate node device, the at least one tail node device includes the second tail node device, the second out interface information is different from the first out interface information, and both the second out label information and the first out label information correspond to an identifier of the first tunnel.

In another possible design, the intermediate node device determines whether the second bit string map information includes the identifier, in the bit string information, of the tail node device that the first multicast stream is expected to reach. The intermediate node device forwards the first multicast stream to the second tail node device through the first tunnel when the intermediate node device determines that the second bit string map information includes the identifier, in the bit string information, of the tail node device that the first multicast stream is expected to reach.

In another possible design, when the intermediate node device determines that a second operation result is not 0, the intermediate node device forwards the first multicast stream to a next hop node device of the intermediate node device through the first tunnel. When the intermediate node device determines that the second operation result is 0, the intermediate node device discards the first multicast stream.

In another possible design, after obtaining the identifier of the tail node device that the first multicast stream is expected to reach, the head node device stores the bit string information in a packet header of the first multicast stream. After receiving the first multicast stream, the intermediate node device may directly obtain the bit string information from the packet header of the first multicast stream.

According to a third aspect, an embodiment of this application provides a head node device. The head node device is configured to implement the method and the functions executed by the head node device in the first aspect, and is implemented by hardware/software. The hardware/software includes units corresponding to the foregoing functions.

According to a fourth aspect, an embodiment of this application provides an intermediate node device. The intermediate node device is configured to implement the method and the functions executed by the intermediate node device in the second aspect, and is implemented by hardware/software. The hardware/software includes units corresponding to the foregoing functions.

According to a fifth aspect, this application provides another head node device, including a processor, a memory, and a communications bus. The communications bus is configured to implement connection and communication between the processor and the memory, and the processor executes a program stored in the memory, to perform the steps in the multicast forwarding method provided in the first aspect.

According to a sixth aspect, this application provides another intermediate node device, including a processor, a memory, and a communications bus. The communications bus is configured to implement connection and communication between the processor and the memory, and the processor executes a program stored in the memory, to perform the steps in the multicast forwarding method provided in the second aspect.

Still another aspect of this application provides a computer readable storage medium, and the computer readable storage medium stores an instruction. When the instruction is run on a computer, the computer is enabled to perform the method in each of the foregoing aspects.

Still another aspect of this application provides a computer program product including an instruction. When the computer program product is run on a computer, the computer is enabled to perform the method in each of the foregoing aspects.

BRIEF DESCRIPTION OF DRAWINGS

To describe the technical solutions in the embodiments of this application or in the background more clearly, the following describes the accompanying drawings required for describing the embodiments of this application or the background.

FIG. 1 is a forwarding table of a node device according to an embodiment of this application;

DESCRIPTION OF EMBODIMENTS

The following describes embodiments of this application with reference to the accompanying drawings in the embodiments of this application.

Figure 6:
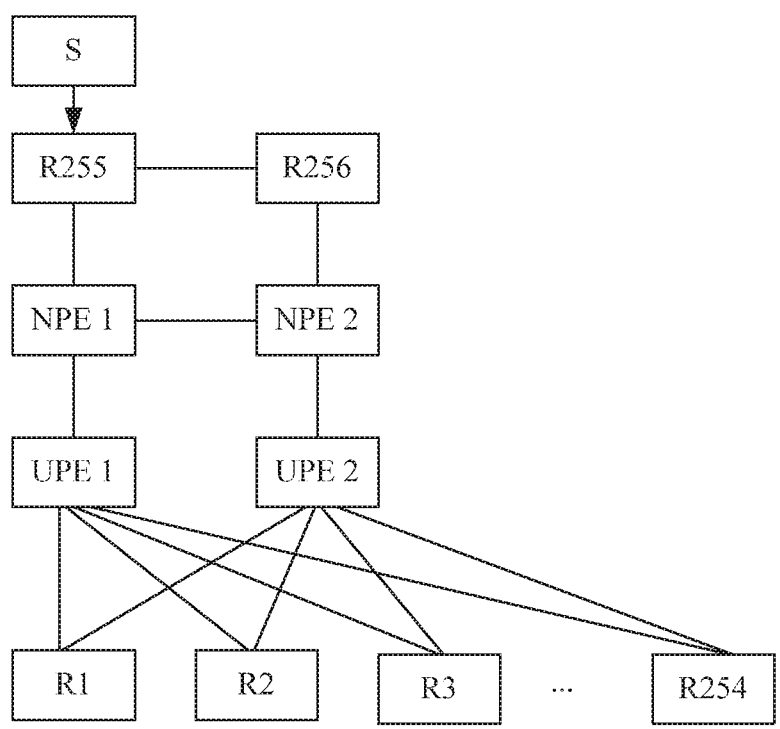
FIG. 6 is a schematic structural diagram of still another multicast forwarding system according to an embodiment of this application.

An embodiment provides a multicast forwarding method, and the method is applied to a BIER multicast network. As shown in FIG. 6, a BIER forwarding router identifier (BIER Forwarding Router id, BFR-id) 000000001, 00000010, . . . , 00100000, or the like is allocated to each of tail node devices R1, R2, . . . , and R256, and the BFR-id is used as an identifier of a tail node device in the multicast network in descriptions of this application. Each node device in the multicast network generates a bit index explicit replication forwarding table (BIER Forwarding Table). FIG. 1 provides a forwarding table of each node device. The first column in the forwarding table of the node device is an identifier (BFR-id) of a tail node device in a multicast network in which the node device is located, the third column is a next hop node device (BIER Forwarding Router Neighbor, BFR-NBR) neighboring to the node device, and the second column is a bitmask (Forwarding Bit Mask. F-BM) of an identifier of a tail node device that a multicast stream reaches after passing the next hop node device of the node device.

For example, a multicast stream (S1, G1) is a multicast stream reaching the tail node device R1 and the tail node device R2 from a head node device R255. The head node device R255 obtains an identifier of the tail node device R1 and an identifier of the tail node device R2 from the received multicast stream (S1. G1), and encodes the identifier 000000001 of the tail node device R1 and the identifier 000000010 of the tail node device R2, to obtain a bit string=00000011. A least significant bit of the bit string is the identifier of the tail node device R1, and the second bit is the identifier of the tail node device R2. The multicast stream starts to be forwarded from the head node device R255, and a specific process is as follows.

S1. After receiving the multicast stream, the head node device R255 encapsulates the bit string=00000011 into the multicast stream.

S2. The head node device R255 reads the bit string=00000011 into a memory, and starts, from the least significant bit of the bit string in the memory, traversing a bit whose code word is 1. Traversing is first performed on a bit position=1, and the bit position indicates R1. Then the head node device R255 reads a row of R1 in a forwarding table of the head node device R255, determines that a BFR-NBR of R1 is an NPE 1, performs a bitwise AND operation on the bit string in the original multicast stream and an F-BM in the row of R1 in the forwarding table, encapsulates an operation result 00000011 into a replicated multicast stream, and sends, to the intermediate node device NPE 1, the multicast stream into which the operation result 00000011 is encapsulated.

S3. The head node device R255 performs a bitwise AND operation on the bit string in the memory and a negated F-BM in the row of R1, that is, eliminates several bits of the F-BM, and an elimination result is a bit string=00000000 in the memory. Then the head node device R255 continues to traverse a bit whose code word is 1 in a significant bit of the bit string. Because there is no other bit whose code word is 1, traversing performed by the head node device R255 ends.

S4. A multicast forwarding process of the intermediate node device NPE 1 is the same as the multicast forwarding process of the head node device R255, and details are not described herein again. The intermediate node device NPE 1 sends, to an intermediate node device UPE 1, the multicast stream carrying the bit string=00000011.

S5. The multicast stream received by the intermediate node device UPE 1 includes the bit string=00000011, and the intermediate node device UPE 1 reads the bit string=00000011 into the memory, and starts, from the least significant bit, traversing a bit whose code word is 1. Traversing is first performed on a bit position=1, and the bit position indicates R1. Then the intermediate node device UPE 1 reads a row of R1 in a forwarding table of the intermediate node device UPE 1, determines that a BFR-NBR of R1 is R1, performs a bitwise AND operation on the bit string in the original multicast stream and an F-BM in the row of R1 in the forwarding table, encapsulates an operation result 00000001 into a replicated multicast stream, and sends, to the tail node device R1, the multicast stream into which the operation result 00000001 is encapsulated.

S6. The intermediate node device UPE 1 performs a bitwise AND operation on the bit string in the memory and a negated F-BM in the row of R1 in the forwarding table of the intermediate node device UPE 1, that is, eliminates several bits of the F-BM in the row of R1, and an elimination result is a bit string=00000010 in the memory. Then the intermediate node device UPE 1 continues to traverse a bit whose code word is 1 in a significant bit. Traversing is first performed on a bit position=2, and the bit position indicates R2. Then the intermediate node device UPE 1 reads a row of R2 in the forwarding table of the intermediate node device UPE 1, determines that a BFR-NBR of R2 is R2, performs a bitwise AND operation on the bit string in the original multicast stream and an F-BM in the row of R2 in the forwarding table, encapsulates the operation result 00000010 into a replicated multicast stream, and sends, to the tail node device R2, the multicast stream into which the operation result 00000010 is encapsulated.

S7. The intermediate node device UPE 1 performs a bitwise AND operation on the bit string in the memory and the negated F-BM in the row of R1 in the forwarding table of the intermediate node device UPE 1, that is, eliminates several bits of the F-BM in the row of R1, and an elimination result is a bit string=00000000 in the memory. Then the intermediate node device continues to traverse a bit whose code word is 1 in a significant bit. Because there is no other bit whose code word is 1, traversing performed by the intermediate node device UPE 1 ends.

In this embodiment, a problem that each multicast stream needs a P2MP forwarding tree in an existing technical solution, causing relatively large working overheads of a node device is effectively resolved. However, in the multicast forwarding process in this embodiment, a bit string in a packet needs to be edited each time multicast replication is performed. Consequently, forwarding efficiency is affected. In addition, a multicast stream needs to be forwarded based on a predetermined path, and when bandwidth of a link on a forwarding path is insufficient, a traffic packet loss is generated. For the foregoing problem, the following solutions are proposed.

Figure 2:
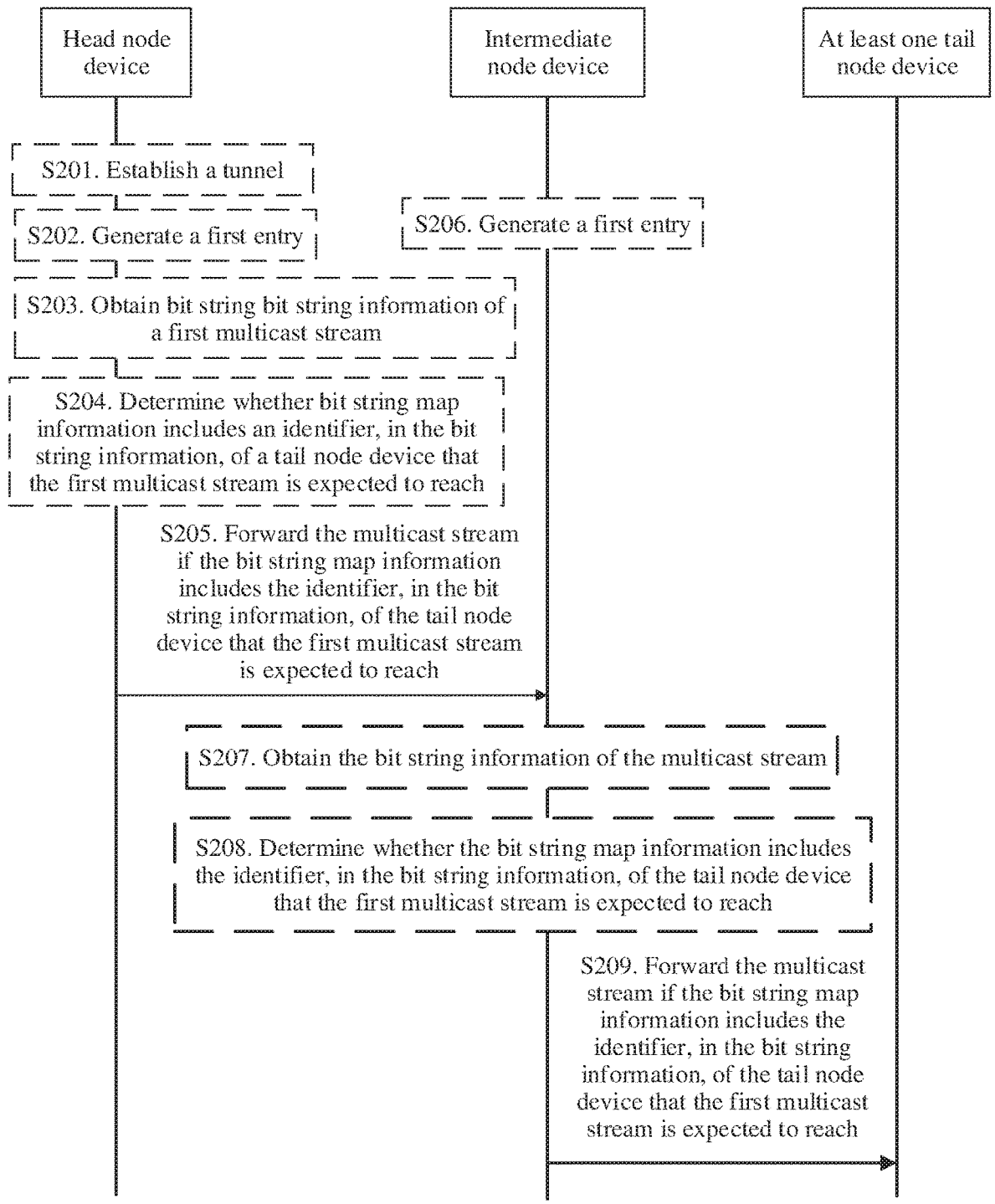
FIG. 2 is a schematic flowchart of a multicast forwarding method according to an embodiment of this application.

As shown in FIG. 2, an embodiment of this application provides a schematic flowchart of a multicast forwarding method. The method is applied to a BIER multicast network, the multicast network includes a head node device, a first intermediate node device, and at least one tail node device. A node device includes but is not limited to a network device such as a router or a switch. The method includes but is not limited to the following steps.

S201. The head node device establishes a first tunnel, where a source node of the first tunnel is the head node device, a destination node of the first tunnel is the at least one tail node device, the first tunnel is used to forward a plurality of multicast streams, and the plurality of multicast streams include a first multicast stream. The first tunnel may be a template tunnel, and is used to forward the multicast stream. The multicast stream may be sent by another node to the head node device, or may be sent by the head node device.

Figure 3A:
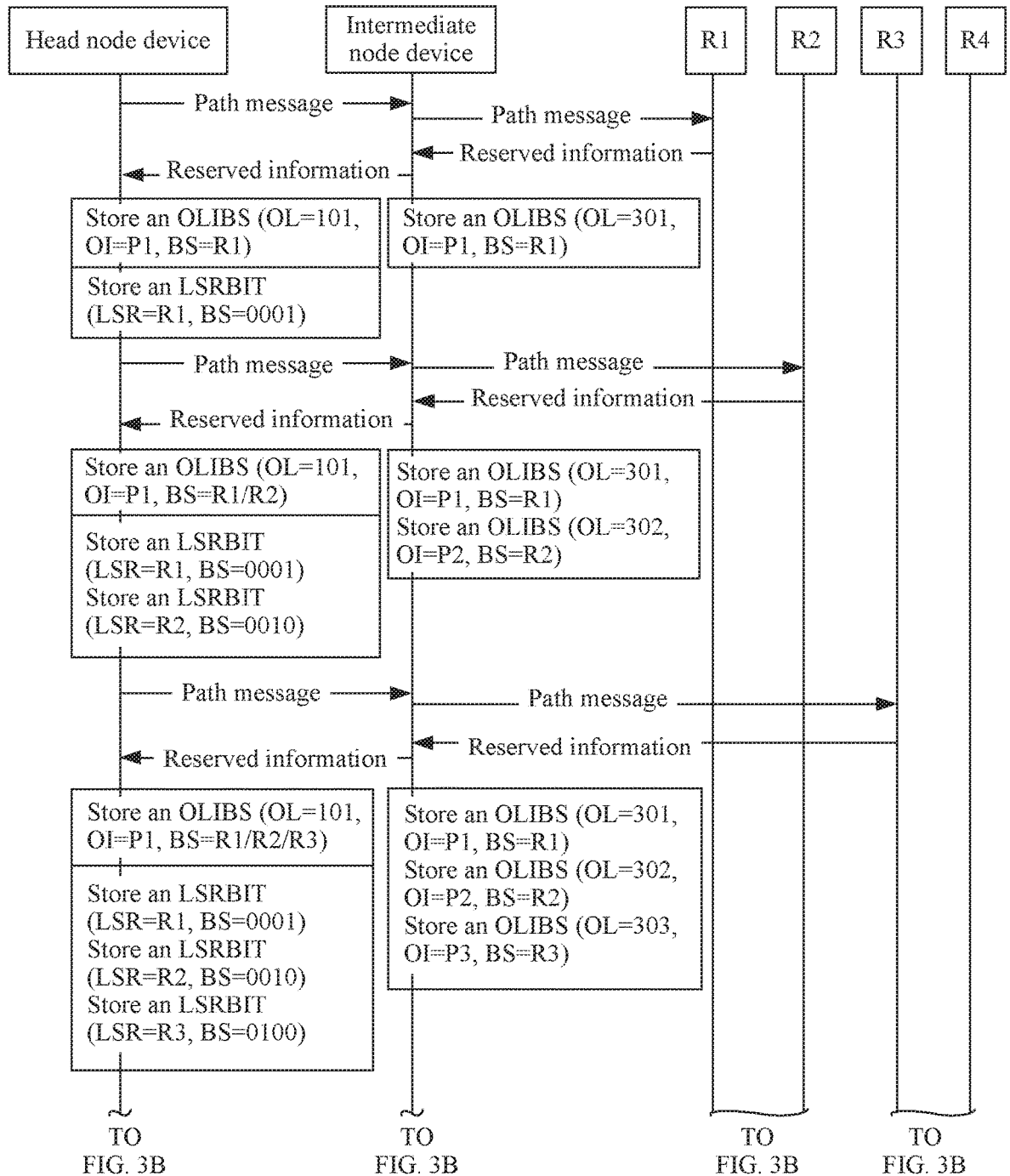
FIG. 3A isare a schematic flowchart of a template tunnel establishment method according to an embodiment of the present application.
Figure 3B:
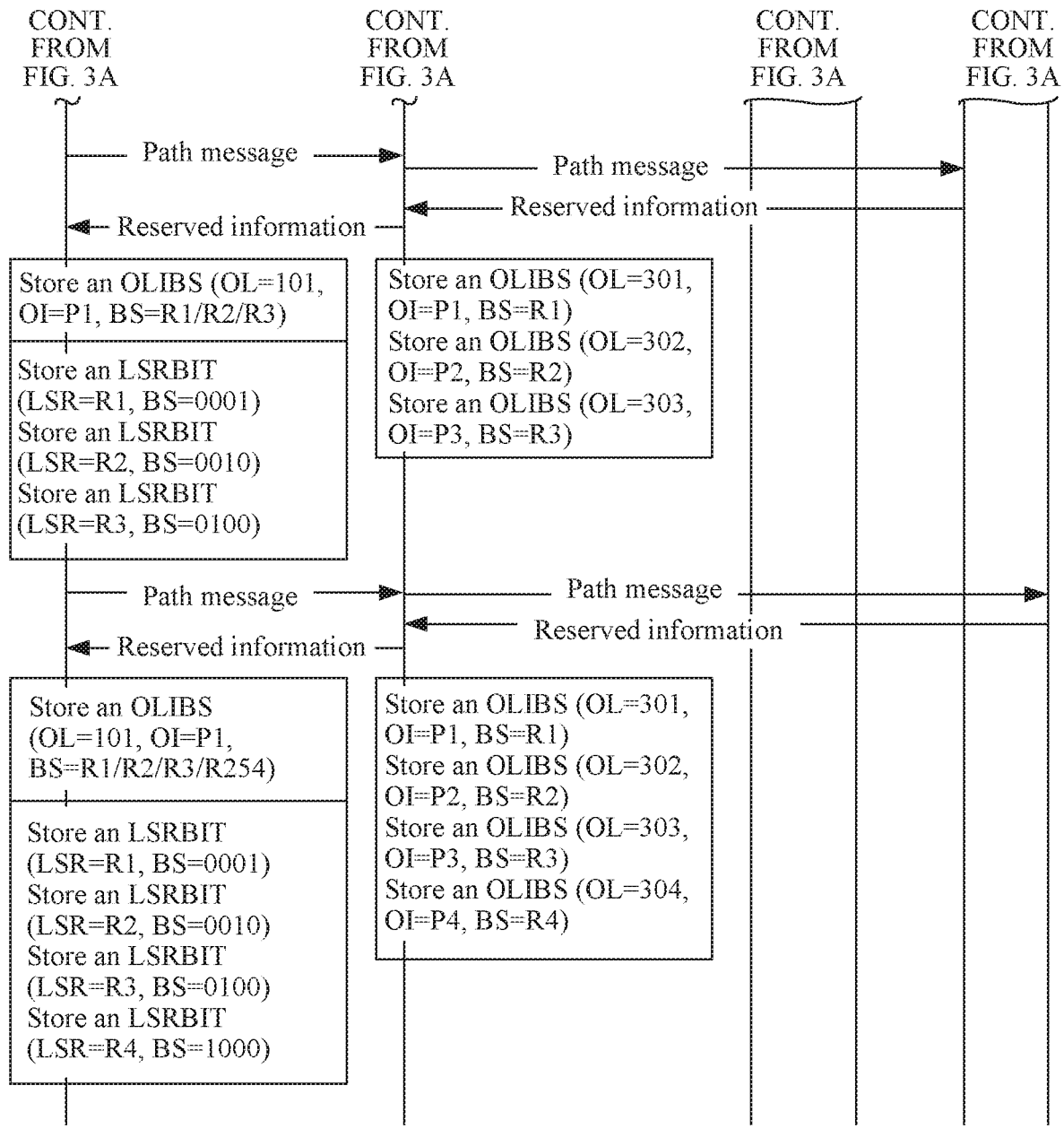
FIG. 3B is a schematic flowchart of the template tunnel establishment method according to an embodiment of the present application.

In an embodiment, as shown in FIG. 3A and FIG. 3B, the head node device may send a path message to an intermediate node device, and the path message includes a tunnel identifier and an address of a tail node device R1. After receiving the path message, the intermediate node device forwards the path message to the tail node device R1. After receiving the path message, the tail node device R1 returns reserved information to the intermediate node device, and the reserved information includes the address of the tail node device R1, an identifier of the tail node device R1, and an out label allocated by the tail node device R1 to the intermediate node device. Therefore, after receiving the reserved information, the intermediate node device may generate an OLIBS entry, for the tail node device R1, in an out label and interface bit string (OLIBS) table based on the reserved information. The OLIBS entry includes the out label and an out interface of the intermediate node device, and the identifier of the tail node device R1. The out interface is used to indicate a physical out interface from the intermediate node device to the tail node device R1, the out label is used to indicate the first tunnel, and the OLIBS entry may be indicated as ({OutLabel, OutIntf}, BSM), where BSM is an abbreviation for a bit string map. The intermediate node device returns the reserved information to the head node device, and the reserved information includes an out label allocated by the intermediate node device to the head node device, the address of the tail node device R1, and the identifier of the tail node device R1. The head node device generates an OLIBS entry based on the reserved information, and the OLIBS entry includes the out label and an out interface of the head node device, and the identifier of the tail node device R1. The out interface is used to indicate a physical out interface of the head node device, and the out label is used to indicate the first tunnel. The head node device further generates a table (Label Switch Router BIT. LSR BIT) of a correspondence between the address (LSR-id) of the tail node device R1 and the identifier (BFR-id) of the tail node device R1. The LSR-id is an abbreviation for a label switch router id (label switch router identifier), and is used to indicate an address of a tail node device in the descriptions of this application.

The head node device sends a path message to the intermediate node device again, and the path message includes a tunnel identifier and an address of a tail node device R2. After receiving the path message, the intermediate node device forwards the path message to the tail node device R2. After receiving the path message, the tail node device R2 returns reserved information to the intermediate node device, and the reserved information includes the address of the tail node device R2, an identifier of the tail node device R2, and an out label allocated by the tail node device R2 to the intermediate node device. Therefore, after receiving the reserved information, the intermediate node device may generate an OLIBS entry, for the tail node device R2, in an OLIBS table based on the reserved information. The OLIBS entry includes the out label and an out interface of the intermediate node device, and the identifier of the tail node device R2. The out interface is used to indicate a physical out interface from the intermediate node device to the tail node device R2, and the out label is used to indicate the first tunnel. The intermediate node device returns the reserved information to the head node device, and the reserved information includes an out label allocated by the intermediate node device to the head node device, the address of the tail node device R2, and the identifier of the tail node device R2. The head node device adds the identifier of the tail node device R2 to a generated OLIBS entry in an OLIBS table of the head node device, and generates a table of a correspondence between the address (LSR-id) of the tail node device R2 and the identifier (BFR-id) of the tail node device R2.

The template tunnel is established by performing the operations a plurality of times in the foregoing manner. If a path message sent all times using the intermediate node device carries addresses of different tail node devices, returned reserved information carries identifiers of different tail node devices such that the head node device finally generates an OLIBS entry in an OLIBS table. A value of a BSM in the OLIBS entry is determined based on identifiers of tail node devices (R1, R2, R3, and R4). In addition, a next hop label forwarding entry (NHLFE) is further generated. The NHLFE table includes a tunnel identifier, an out label, and an out interface, and is indicated as (tunnel ID, list {out label, out interface}). The intermediate node device may generate an OLIBS table including four OLIBS entries, and may further generate an NHLFE table. The NHLFE table includes a tunnel identifier, an out label, and an out interface, and is indicated as (tunnel ID, list{out label, out interface}). The list has four records, including out interfaces and out labels that are respectively from the intermediate node device to the tail node device R1, the tail node device R2, the tail node device R3, and the tail node device R4.

Figure 4:
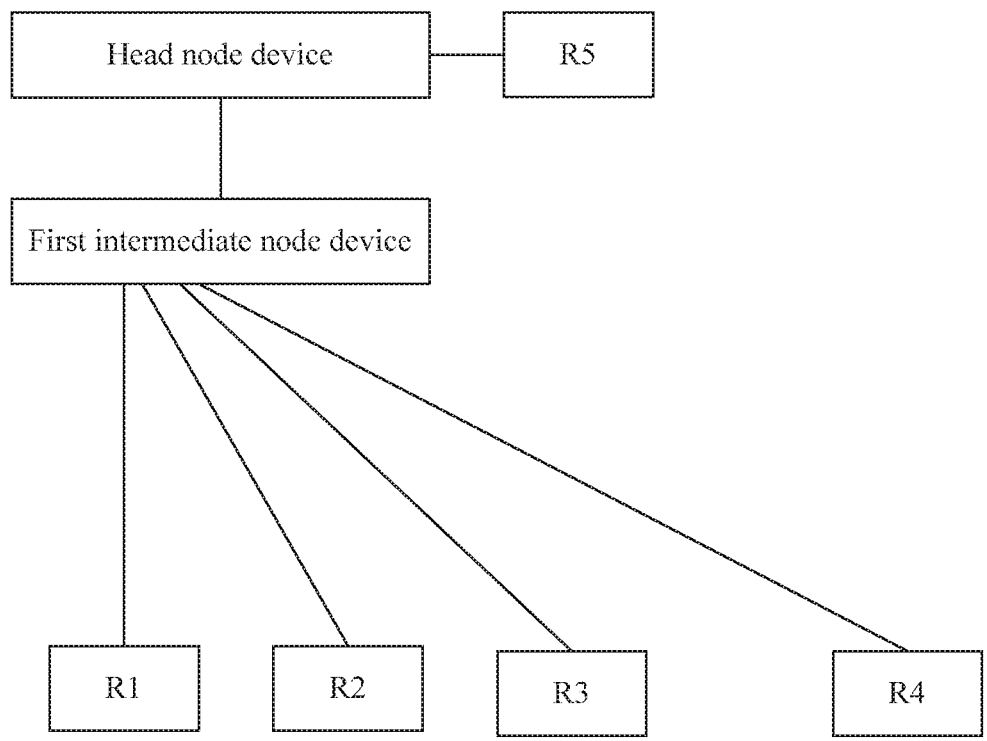
FIG. 4 is a schematic structural diagram of a multicast forwarding system according to an embodiment of this application.

Optionally, as shown in FIG. 4, if the head node device is directly connected to a tail node device R5, the head node device may further generate another OLIBS entry in the OLIBS table, and the OLIBS entry includes the out label and the out interface of the head node device and an identifier of the tail node device R5. The out interface is used to indicate a physical out interface from the head node device to the tail node device R5, and the out label is used to indicate the first tunnel. If the intermediate node device includes two node devices, an intermediate node device directly connected to the head node device also generates an OLIBS table. The OLIBS table includes one OLIBS entry, and the OLIBS entry includes an out label and an out interface of the intermediate node device and the identifiers of the tail node devices (R1, R2, R3, and R4). An intermediate node device directly connected to the tail node device also generates an OLIBS table. The OLIBS table includes four OLIBS entries, and BSMs in the four OLIBS entries are respectively the identifier of the tail node device R1, the identifier of the tail node device R2, the identifier of the tail node device R3, and the identifier of the tail node device R4. Cases of a plurality of other intermediate node devices are obtained by analogy. Details are not described herein again.

In another embodiment, an OLIBS table, an NHLFE table, and a table of a correspondence between an LSR-id and a BFR-id may be configured on the head node device, and an OLIBS table and an NHLFE table may be configured on the intermediate node device. Alternatively, the head node device may receive a table of a correspondence between an LSR-id and a BFR-id, an OLIBS table, and an NHLFE table that are delivered by a controller, and the intermediate node device may receive an OLIBS table and an NHLFE table that are delivered by the controller. The established template tunnel is obtained in the foregoing manner.

S202. The head node device generates a first entry, where the first entry includes first bit string map information, the first bit string map information includes an identifier of a first tail node device that is not directly connected to the head node device, and the at least one tail node device includes the first tail node device. Two directly connected node devices may directly communicate with each other through an established network connection, and another node device does not need to perform forwarding. There is no direct network connection between two indirectly connected node devices, and another node device needs to perform forwarding during communication between the two node devices.

During implementation, it can be learned from the above that when a tail node device returns reserved information to the intermediate node device, the reserved information includes an identifier of the tail node device. After the head node device sends a path message to the tail node device a plurality of times, in a process of returning the reserved information, both the head node device and the intermediate node device may learn of an identifier of a tail node device that the first multicast stream can reach through the first tunnel in order to generate the first entry. Alternatively, the head node device may learn, based on an OLIBS table that is preconfigured or delivered by a controller of an identifier of a tail node device that the first multicast stream can reach through the first tunnel in order to generate the first entry. The first entry includes the bit string map information. As shown in FIG. 4, a bit string map in the head node device is determined based on the identifiers of the tail node devices (R1, R2, R3, and R4), and the bit string map may be indicated as 00001111. A least significant bit of the bit string map may indicate the identifier of the tail node device R1, the second bit indicates the identifier of the tail node device R2, the third bit indicates the identifier of the tail node device R3, the fourth bit indicates the identifier of the tail node device R4, and the like.

When the template tunnel includes only one path, the first entry may include the first bit string map information. When the template tunnel includes a plurality of paths, the first entry further includes first out interface information and first out label information. The first out interface information is used to indicate a physical out interface of the head node device, and the first out label information is used to indicate the first tunnel.

For example, as shown in FIG. 4, if the template tunnel includes only a first path, the head node device generates the first entry when establishing the first path of the first tunnel, and the first path includes the head node device, the first intermediate node device, and the tail node devices (R1, R2, R3, and R4). The first path starts from the head node device, and reaches the tail node device by passing through the first intermediate node device. The head node device is indirectly connected to the tail node devices (R1, R2, R3, and R4), and the first bit string map information includes the identifiers of the tail node devices (R1, R2, R3, and R4). Optionally, if the template tunnel includes a plurality of paths, the head node device further generates a second entry. The second entry includes second bit string map information, second out interface information, and second out label information. The second bit string map information includes an identifier of a second tail node device that is directly connected to the head node device. The at least one tail node device includes the second tail node device. The second out interface information is different from the first out interface information, and both the second out label information and the first out label information correspond to an identifier of the first tunnel.

For example, as shown in FIG. 4, the head node device generates the second entry when establishing a second path of the first tunnel. The second path includes the head node device and the tail node device R5. The second path starts from the head node device, and directly reaches the tail node device. The head node device is directly connected to the tail node device R5. The out interface information in the second entry is different from the out interface information in the first entry, indicating that a next hop device connected to the head node device through the second path is different from a next hop device connected to the head node device through the first path. A value of an out label in the second entry may be the same as or different from a value of an out label in the first entry. However, both the out label information in the second entry and the out label information in the first entry correspond to the identifier of the first tunnel, indicating that both the first path and the second path belong to the first tunnel.

For another example, in the foregoing template tunnel establishment process, when the intermediate node device returns reserved information to the head node device, the intermediate node device may allocate an out label 101 to the head node device. The out label 101 corresponds to the tunnel identifier of the first tunnel, and the head node device may be connected to the first intermediate node device through a first out interface. When the tail node device R5 returns reserved information to the head node device, the tail node device R5 may also allocate an out label 101 to the head node device. The out label 101 corresponds to the tunnel identifier of the first tunnel, and is the same as an out label 101 of the head node device on the first path of the first tunnel. Alternatively, the tail node device R5 may allocate an out label 102 to the head node device, and the out label 102 is different from an out label 101 of the head node device on the first path of the first tunnel. However, the out label 102 also corresponds to the tunnel identifier of the first tunnel.

S203. The head node device obtains bit string information of the first multicast stream, where the bit string information includes an identifier of a tail node device that the first multicast stream is expected to reach.

During specific implementation, the head node device may obtain overlay information of the multicast stream and a table of a correspondence between an LSR-id and a BFR-id. The overlay information includes address information of all tail node devices that the multicast stream is expected to reach. Then the head node device obtains the bit string information based on the overlay information and the table of the correspondence between an LSR-id and a BFR-id.

As shown in FIG. 4, identifiers 00000001, 00000010, 00000100, and 00001000 are respectively assigned to the tail node device R1, the tail node device R2, the tail node device R3, and the tail node device R4. The head node device learns that it is expected that a multicast stream is forwarded to the tail node device R1, the tail node device R2, and the tail node device R4. Therefore, bit string information includes the identifier of the tail node device R1, the identifier of the tail node device R2, and the identifier of the tail node device R4. A bit string may be indicated as 00001011. A least significant bit of the bit string may indicate the identifier of the tail node device R1, the second bit indicates the identifier of the tail node device R2, the third bit 0 indicates inexistence of the identifier of the tail node device R3, the fourth bit indicates the identifier of the tail node device R4, and the like.

S204. The head node device determines whether the first bit string map information includes the identifier, in the bit string information, of the tail node device that the first multicast stream is expected to reach.

For example, as shown in FIG. 4, the head node device sends the first multicast stream to the tail node devices (R1, R2, and R4) using the intermediate node device based on the bit string information of the first multicast stream, and learns, based on a generated bit string map, that tail node devices directly connected to the intermediate node device include the identifier of the tail node device R1, the identifier of the tail node device R2, the identifier of the tail node device R3, and the identifier of the tail node device R4. Therefore, the bit string map information includes the identifier of the tail node device R1, the identifier of the tail node device R2, and the identifier of the tail node device R4 that are in the bit string information.

Further, the head node device may obtain a first operation result based on the bit string information and the bit string map information. A value of the first operation result is equal to a value obtained by performing a bitwise AND operation on the bit string information and the bit string map information.

For example, as shown in FIG. 4, the bit string map information is determined based on the identifiers of the tail node devices (R1, R2, R3, and R4), and a bit string map may be indicated as 00001111. A least significant bit of the bit string map may indicate the identifier of the tail node device R1, the second bit indicates the identifier of the tail node device R2, the third bit indicates the identifier of the tail node device R3, and the fourth bit indicates the identifier of the tail node device R4. The bit string information is determined based on the identifier of the tail node device R1, the identifier of the tail node device R2, and the identifier of the tail node device R4, and a bit string may be indicated as 00001011. A least significant bit of the bit string may indicate the identifier of the tail node device R1, the second bit indicates the identifier of the tail node device R2, the third bit indicates inexistence of the identifier of the tail node device R3, and the fourth bit indicates the identifier of the tail node device R4. The first operation result is a result obtained after a bitwise AND operation is performed on 00001111 and 00001011. A value of the operation result is 00001011, and the head node device determines to send the first multicast stream to the intermediate node device.

Further, the head node device may determine, based on the first out interface information and the first out label information, the physical out interface indicated by the first out interface information, and send the first multicast stream through the first tunnel.

For example, as shown in FIG. 4, the first tunnel includes the first path and the second path, the first entry includes the first out interface information and the first out label information of the head node device on the first path, and the second entry includes the second out interface information and the second out label information of the head node device on the second path. Even though both the first out label information and the second out label information correspond to the identifier of the first tunnel, the first out interface information is different from the second out interface information. The first out interface information directs at the first intermediate node device, but the second out interface information directs at the tail node device R5. Therefore, the head node device determines, based on the first out interface information and the first out label information, to send the multicast stream to the first intermediate node device.

Further, optionally, the head node device determines whether the second bit string map information includes the identifier, in the bit string information, of the tail node device that the first multicast stream is expected to reach. The head node device forwards the first multicast stream to the second tail node device through the first tunnel when the head node device determines that the second bit string map information includes the identifier, in the bit string information, of the tail node device that the first multicast stream is expected to reach.

For example, as shown in FIG. 4, the second bit string map information includes the identifier of the tail node device R5, and identifiers (the bit string information) of tail node devices that the first multicast stream is expected to reach include the identifier of the tail node device R1, the identifier of the tail node device R2, and the identifier of the tail node device R4. Therefore, the head node device determines that the second bit string map information does not include the identifier, in the bit string information, of the tail node device that the first multicast stream is expected to reach, and the head node device does not forward the first multicast stream to the tail node device R5 through the first tunnel.

S205. The head node device forwards the first multicast stream to the first intermediate node device through the first tunnel when the head node device determines that the first bit string map information includes the identifier, in the bit string information, of the tail node device that the first multicast stream is expected to reach. The head node device discards the first multicast stream when the head node device determines that the first bit string map information does not include the identifier, in the bit string information, of the tail node device that the first multicast stream is expected to reach.

For example, when the head node device determines that the first operation result is not 0, the head node device forwards the first multicast stream to the first intermediate node device through the first tunnel. For example, a bitwise AND operation is performed on a bit string map-=00011111 and a bit string=00000001, and an operation result is 00000001. Therefore, the head node device sends the multicast stream to the intermediate node device. When the head node device determines that the first operation result is 0, the head node device does not forward the first multicast stream to the first intermediate node device. For example, if a result of a bitwise AND operation performed on a bit string map=11111110 and a bit string=00000001 is 00000000, the head node device does not send the first multicast stream to the intermediate node device.

Optionally, the head node device establishes a second tunnel by passing through the second intermediate node device, a source node of the second tunnel is the head node device, a destination node of the second tunnel is the at least one tail node device, the second tunnel is used to forward the plurality of multicast streams, and the second tunnel includes a second multicast stream. When the head node device determines that bandwidth usage of the first tunnel is greater than a first threshold, the head node device forwards the second multicast stream through the second tunnel.

Figure 5:
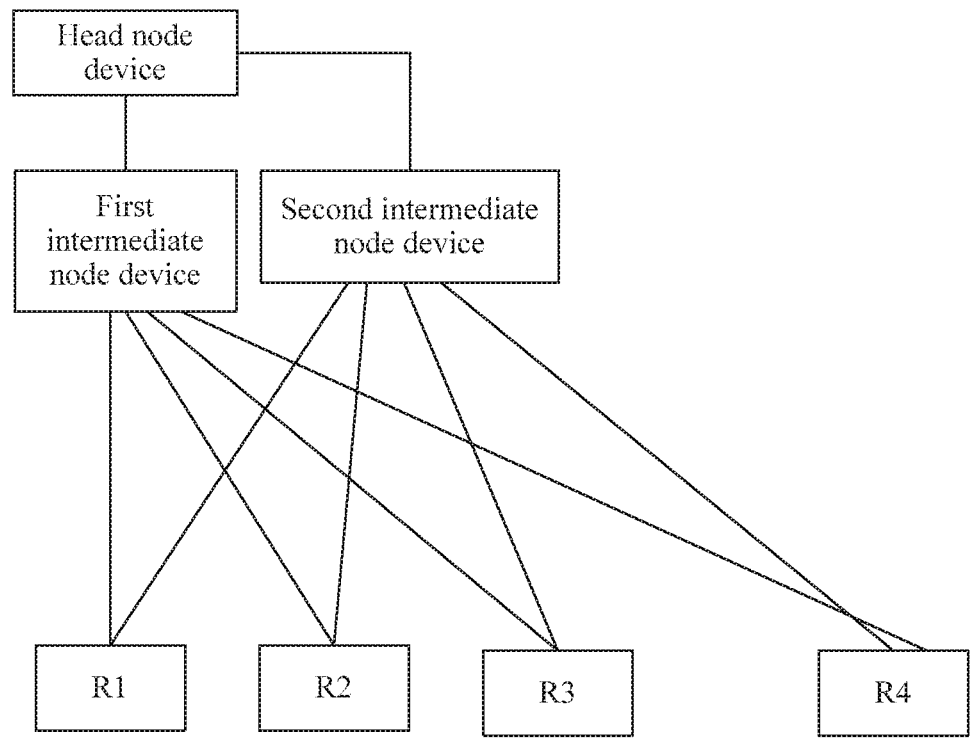
FIG. 5 is a schematic structural diagram of another multicast forwarding system according to an embodiment of this application.

As shown in FIG. 5, the head node device may establish a plurality of tunnels having different priorities. The head node device may obtain bandwidth consumption on each tunnel, and then select, based on the bandwidth consumption and the priorities, the tunnel for forwarding. The first tunnel is the head node device→the first intermediate node device→{R1, R2, R3, R4}. The second tunnel is the head node device→the second intermediate node device→{R1. R2, R3, R4}. A path priority of the first tunnel is the highest, and a path priority of the second tunnel comes second. After the first tunnel is preferentially selected to forward a multicast stream, it is learned that when a $401^{st}$ multicast stream is to be processed, bandwidth consumption of the first 400 multicast streams is larger than maximum bandwidth carried by a path of the first tunnel. Therefore, the second tunnel is selected to process the $401^{st}$ multicast stream. For a process of establishing the second tunnel, refer to the foregoing process of establishing the first tunnel. Details are not described herein.

S206. The intermediate node device generates a first entry, where the first entry includes first bit string map information, and the first bit string map information includes an identifier of a first tail node device that is directly connected to the intermediate node device.

In an embodiment, the head node device may send a path message to the intermediate node device, and the path message includes a tunnel identifier and an address of the tail node device R1. After receiving the path message, the intermediate node device forwards the path message to the tail node device R1. After receiving the path message, the tail node device R1 returns reserved information to the intermediate node device, and the reserved information includes the address of the tail node device R1, an identifier of the tail node device R1, and an out label allocated by the tail node device R1 to the intermediate node device. Therefore, after receiving the reserved information, the intermediate node device may generate an OLIBS entry, for the tail node device R1, in an OLIBS table based on the reserved information. The OLIBS entry includes the out label and an out interface of the intermediate node device, and the identifier of the tail node device R1. The out interface is used to indicate a physical out interface from the intermediate node device to the tail node device R1. The out label is used to indicate the first tunnel, and is indicated as ({OutLabel. OutIntf}, BSM), and the BSM is an abbreviation for a bit string map.

The head node device sends a path message to the intermediate node device again, and the path message includes a tunnel identifier and an address of a tail node device R2. After receiving the path message, the intermediate node device forwards the path message to the tail node device R2. After receiving the path message, the tail node device R2 returns reserved information to the intermediate node device, and the reserved information includes the address of the tail node device R2, an identifier of the tail node device R2, and an out label allocated by the tail node device R2 to the intermediate node device. Therefore, after receiving the reserved information, the intermediate node device may generate an OLIBS entry, for the tail node device R2, in an OLIBS table based on the reserved information. The OLIBS entry includes the out label and an out interface of the intermediate node device, and the identifier of the tail node device R2. The out interface is used to indicate a physical out interface from the intermediate node device to the tail node device R2, and the out label is used to indicate the first tunnel.

The template tunnel is established by performing the operations a plurality of times in the foregoing manner. The intermediate node device may generate an OLIBS table including four OLIBS entries, and may further generate an NHLFE table. The NHLFE table includes a tunnel identifier, an out label, and an out interface, and is indicated as (tunnel ID, list{out label, out interface}). The list has four records, including out interfaces and out labels that are respectively from the intermediate node device to the tail node device R1, the tail node device R2, the tail node device R3, and the tail node device R4.

In another embodiment, an OLIBS table and an NHLFE table may be configured on the intermediate node device; or an OLIBS table and an NHLFE table of the intermediate node device that are delivered by a controller are received.

It can be learned from the above that when a tail node device returns reserved information to the intermediate node device, the reserved information includes an identifier of the tail node device. After the head node device sends a path message to the tail node device a plurality of times, in a process of returning the reserved information, the intermediate node device may learn of an identifier of a tail node device that the first multicast stream can reach through the first tunnel in order to generate the first entry. Alternatively, an identifier of a tail node device that the first multicast stream can reach through the first tunnel may be learned of based on an OLIBS table that is preconfigured or delivered by a controller in order to generate the first entry. The first entry includes the bit string map information. As shown in FIG. 4, a bit string map in the intermediate node device may be separately indicated as 00000001, 00000010, 00000100, and 00001000, 00000001 indicates the identifier of the tail node device R1, 00000010 indicates the identifier of the tail node device R2, 00000100 indicates the identifier of the tail node device R3, and 00001000 indicates the identifier of the tail node device R4.

S207. The intermediate node device obtains the bit string information included in the first multicast stream, where the bit string information includes the identifier of the tail node device that the first multicast stream is expected to reach.

During specific implementation, after obtaining the identifier of the tail node device that the first multicast stream is expected to reach, the head node device stores the bit string information in a packet header of the first multicast stream. After receiving the first multicast stream, the intermediate node device may directly obtain the bit string information from the packet header of the first multicast stream.

S208. The intermediate node device determines whether the first bit string map information includes the identifier, in the bit string information, of the tail node device that the first multicast stream is expected to reach.

For example, as shown in FIG. 4, the intermediate node device may separately send, based on the bit string information of the first multicast stream, the first multicast stream to the tail node device R1, the tail node device R2, and the tail node device R4. The intermediate node device is separately directly connected to the tail node devices (R1, R2, R3, and R4). Therefore, four pieces of bit string map information are generated on the intermediate node device. The four pieces of bit string map information respectively include the identifier of the tail node device R1, the identifier of the tail node device R2, the identifier of the tail node device R3, and the identifier of the tail node device R4. Therefore, the intermediate node device may determine that the third piece of bit string map information does not include an identifier of any one of the tail node device R1, the tail node device R2, or the tail node device R4, and the remaining pieces of bit string map information each includes an identifier of any one of the tail node device R1, the tail node device R2, and the tail node device R4.

Further, the intermediate node device obtains a first operation result based on the bit string information and the first bit string map information. A value of the first operation result is equal to a value obtained by performing a bitwise AND operation on the bit string information and the first bit string map information.

For example, as shown in FIG. 4, the four pieces of bit string map information are respectively 00000001, 00000010, 00000100, and 00001000, 00000001 may indicate the identifier of the tail node device R1, 00000010 may indicate the identifier of the tail node device R2, 00000100 may indicate the identifier of the tail node device R3, and 00001000 may indicate the identifier of the tail node device R4. The bit string information is determined based on the identifier of the tail node device R1, the identifier of the tail node device R2, and the identifier of the tail node device R4, and a bit string may be indicated as 00001011. A least significant bit of the bit string may indicate the identifier of the tail node device R1, the second bit indicates the identifier of the tail node device R2, the third bit 0 indicates inexistence of the identifier of the tail node device R3, and the fourth bit indicates the identifier of the tail node device R4. A bitwise AND operation is performed on 00001011 and each of 00000001, 00000010, 00000100, and 00001000. If an operation result of the first group is 00000001, the intermediate node device determines to send the first multicast stream to the tail node device R1. If an operation result of the second group is 00000010, the intermediate node device determines to send the first multicast stream to the tail node device R2. If an operation result of the third group is 00000000, the intermediate node device determines not to send the first multicast stream to the tail node device R3. If an operation result of the fourth group is 00001000, the intermediate node device determines to send the first multicast stream to the tail node device R4.

Further, the first entry further includes first out interface information and first out label information, the first out interface information is used to indicate a physical out interface of the intermediate node device, and the first out label information is used to indicate the first tunnel. The intermediate node device determines, based on the first out interface information and the first out label information, the physical out interface indicated by the first out interface information, and sends the first multicast stream through the first tunnel.

For example, as shown in FIG. 4, the intermediate node device is separately directly connected to the tail node device R1, the tail node device R2, the tail node device R3, and the tail node device R4, and connections between the intermediate node device and R1/R2/R3/R4 all belong to the first tunnel. However, the intermediate node device is separately connected to the tail node device R1, the tail node device R2, the tail node device R3, and the tail node device R4 through different physical out interfaces. Out label information may be the same or may be different, but the out label information of any two of the tail node devices indicates the first tunnel. For example, the tail node device R1 may allocate an out label 101 to the intermediate node device, and the out label 101 corresponds to the tunnel identifier of the first tunnel. Alternatively, the tail node device R2 may allocate an out label 102 to the intermediate node device, and the out label 102 also corresponds to the tunnel identifier of the first tunnel.

Optionally, the head node device further generates a second entry. The second entry includes second bit string map information, second out interface information, and second out label information, the second bit string map information includes an identifier of a second tail node device that is directly connected to the intermediate node device, the at least one tail node device includes the second tail node device, the second out interface information is different from the first out interface information, both the second out label information and the first out label information correspond to the identifier of the first tunnel. The intermediate node device determines whether the second bit string map information includes the identifier, in the bit string information, of the tail node device that the first multicast stream is expected to reach. The intermediate node device forwards the first multicast stream to the second tail node device through the first tunnel when the intermediate node device determines that the second bit string map information includes the identifier, in the bit string information, of the tail node device that the first multicast stream is expected to reach.

S209. The intermediate node device forwards the first multicast stream to the first tail node device through the first tunnel when the intermediate node device determines that the first bit string map information includes the identifier, in the bit string information, of the tail node device that the first multicast stream is expected to reach.

During specific implementation, when the intermediate node device determines that a second operation result is not 0, the intermediate node device forwards the first multicast stream to a next hop node device of the intermediate node device through the first tunnel. When the intermediate node device determines that the second operation result is 0, the intermediate node device discards the first multicast stream.

For example, as shown in FIG. 4, a bitwise AND operation is performed on a value 00001011 of a bit string and each of values 00000001, 00000010, 00000100, and 00001000 of a bit string map in the intermediate node device. If an operation result of the first group is 00000001, the intermediate node device sends the first multicast stream to the tail node device R1. If an operation result of the second group is 00000010, the intermediate node device sends the first multicast stream to the tail node device R2. If an operation result of the third group is 00000000, the intermediate node device does not send the first multicast stream to the tail node device R3. If an operation result of the fourth group is 00001000, the intermediate node device sends the first multicast stream to the tail node device R4.

Specific implementations of the foregoing embodiment are described below using examples.

FIG. 6 is a schematic structural diagram of a multicast forwarding system according to an embodiment of this application. The multicast forwarding system includes a plurality of node devices, and the plurality of node devices include a head node device; intermediate node devices, and tail node devices. The head node device includes a node R255, the intermediate node devices include an intermediate node device R256, an intermediate node device NPE 1, an intermediate node device NPE 2, an intermediate node device UPE 1, and an intermediate node device UPE 2; and the tail node devices include a tail node device R1, a tail node device R2, a tail node device R3 . . . , a tail node device R254, and the like.

Figure 7:
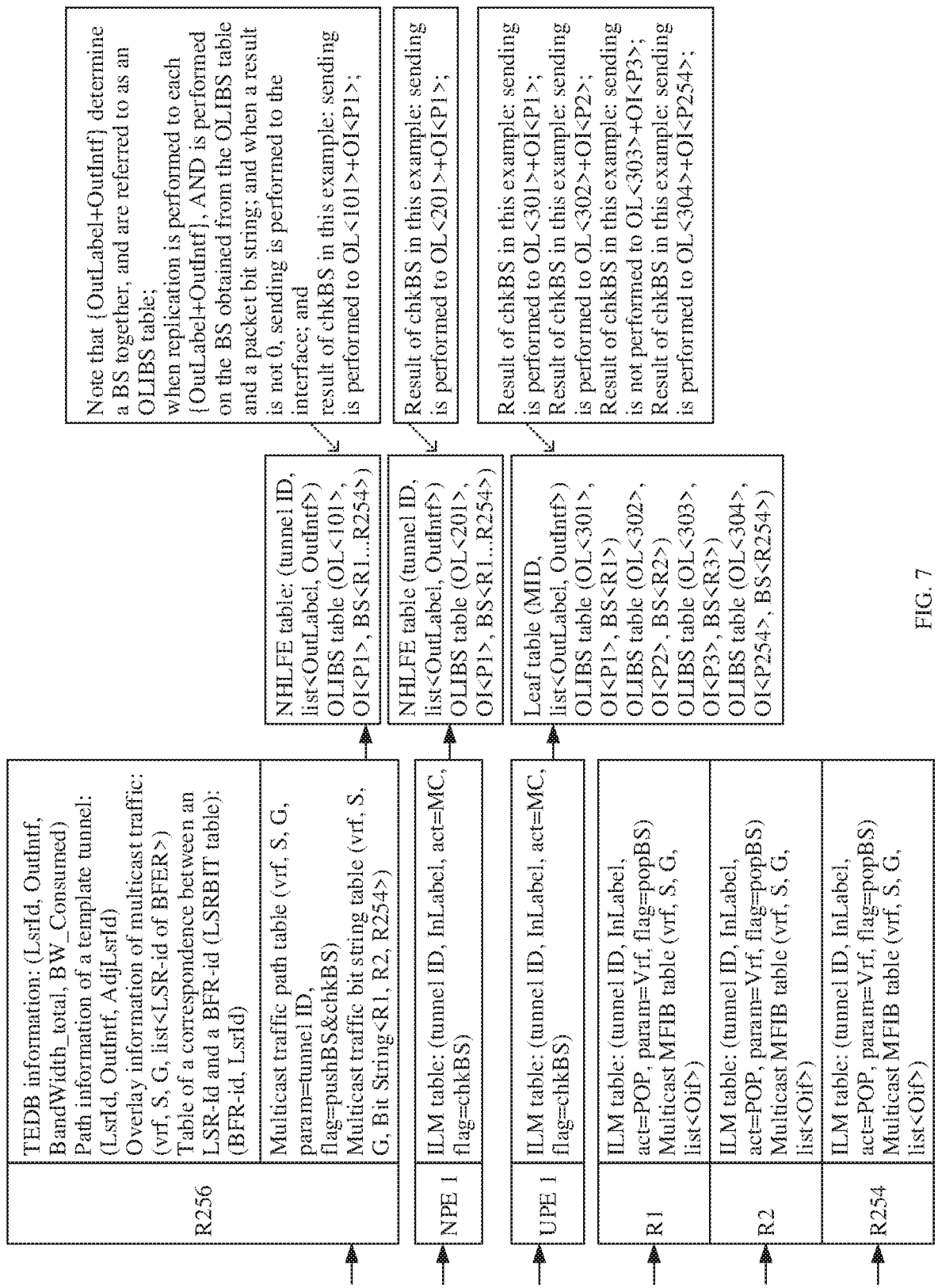
FIG. 7 is a schematic diagram of an entry on a node device according to an embodiment of the present application.

As shown in FIG. 6, the head node device sends a multicast stream to a tail node device using a plurality of intermediate node devices. The head node device R255 learns that it is expected that a multicast stream is forwarded to the tail node device R1, the tail node device R2, and the tail node device R254, and encodes an identifier of the tail node device R1, an identifier of the tail node device R2, and an identifier of the tail node device R254 to obtain a bit string=00001011. A least significant bit of the bit string indicates the identifier of the tail node device R1, the second bit indicates the identifier of the tail node device R2, and the fourth bit indicates the identifier of the tail node device R254. As shown in FIG. 7, the head node device R255 stores an NHLFE table and an OLIBS table. The NHLFE table is indicated as (tunnel identifier, at least one (out label, out interface)), and the OLIBS table is indicated as ({out label, out interface}, BSM). The BSM is an abbreviation for a bit string map. Each (out label, out interface) corresponds to one bit string map, and the bit string map is obtained by encoding identifiers of all downstream tail node devices of tout label, out interface). Still as shown in FIG. 7, the head node device R255 further stores path information of a template tunnel, overlay information, TEDB information, and the like, and a multicast stream path table and a multicast stream bit string table may be generated based on the information. It can be learned from FIG. 6 that downstream node devices neighboring to the head node device R255 include the intermediate node device NPE 1 and the intermediate node device R256. Therefore, the head node device R255 includes (first out label, first out interface) corresponding to the intermediate node device NPE 1 and (second out label, second out interface) corresponding to the intermediate node. After a template tunnel R255→NPE 1→UPE 1→{R1, R2, R3, . . . , R254} is determined, it can be learned from the NHLFE table that the template tunnel indicates that (first out label, first out interface) corresponds to the intermediate node device NPE 1. Therefore, the intermediate node device NPE 1 is selected to forward a multicast stream. It can be learned from the template tunnel R255→NPE 1→UPE 1→{R1, R2, R3, . . . , R254} that all downstream tail node devices of {first out label, first out interface} include the tail node device R1, the tail node device R2, the tail node device R3, . . . , and the tail node device R254. Therefore, the identifier of the tail node device R1, the identifier of the tail node device R2, an identifier of the tail node device R3, . . . , and the identifier of the tail node device R254 are encoded to obtain a bit string map=11111111. Finally a bitwise AND operation is performed on the bit string map and the bit string, and an operation result is 00001011. Therefore, the head node device R255 sends a first multicast stream to the intermediate node device NPE 1.

Still as shown in FIG. 7, the intermediate node device NPE 1 stores an incoming label map (Incoming Label Map. ILM) table, an NHLFE table, and an OLIBS table. The ILM table includes a tunnel identifier and an in label of the intermediate node device NPE 1, and is indicated as (tunnel ID, in label). The NHLFE table is indicated as (tunnel identifier, at least one (out label, out interface)). The OLIBS table is indicated as ({out label, out interface}, BSM). Each piece of tout label, out interface) corresponds to one bit string map. The bit string map is obtained by encoding identifiers of all downstream tail node devices of tout label, out interface). Downstream node devices neighboring to the intermediate node device NPE 1 include the intermediate node device NPE 2 and the intermediate node device UPE1. Therefore, the intermediate node device NPE 1 includes (first out label, first out interface) corresponding to the intermediate node device NPE 1 and (second out label, second out interface) corresponding to the intermediate node. After a template tunnel R255→NPE 1→UPE 1→{R1, R2, R3, . . . , R254} is determined based on the in label of the intermediate node device NPE 1, it can be learned from the NHLFE table that the template tunnel indicates that {first out label, first out interface} of the intermediate node device NPE 1 corresponds to the intermediate node device UPE 1. Therefore, the intermediate node device UPE 1 is selected to forward a multicast stream. It can be learned from the template tunnel R255→NPE 1→UPE 1→{R1, R2, R3 . . . , R254} that all downstream tail node devices of {first out label, first out interface} include the tail node device R1, the tail node device R2, the tail node device R3, . . . , and the tail node device R254. Therefore, the identifier of the tail node device R1, the identifier of the tail node device R2, an identifier of the tail node device R3, . . . , and the identifier of the tail node device R254 are encoded to obtain a bit string map=111111111. Finally a bitwise AND operation is performed on the bit string map and the bit string, and an operation result is 00001011. Therefore, the intermediate node device NPE 1 sends a first multicast stream to the intermediate node device UPE 1.

Still as shown in FIG. 7 again, the intermediate node device UPE 1 stores an ILM table and an NHLFE table. The ILM table includes a tunnel identifier and an in label of the intermediate node device UPE 1, and is indicated as (tunnel ID, in label). The NHLFE table is indicated as (tunnel identifier, at least one {out label, out interface}). Next hop node devices of the intermediate node device UPE 1 include the tail node device R1, the tail node device R2, the tail node device R3, . . . , and the tail node device R254. Therefore, an OLIBS table in the intermediate node device UPE 1 includes ((out label, out interface)=out interface to R1. BSM=00000001), where the value 00000001 of the BSM is the identifier of the tail node device R1; ({out label, out interface}=out interface to R2, BSM=00000010), where the value 00000010 of the BSM is the identifier of the tail node device R2; ({the out label, out interface}=out interface to R3, BSM=00000100), where the value 00000100 of the BSM is an identifier of the tail node device R3; . . . ; and ((out label, out interface)=out interface to R254. BSM=00001000), where the value 00001000 of the BSM is the identifier of the tail node device R254. A bitwise AND operation is performed on a bit string=00001011 in the foregoing obtained bit string map information and the value of the BSM in each OLIBS table. Because a value obtained after a bitwise AND operation is performed on the BSM=00000001 and the bit string=00001011 is 00000001, the intermediate node device UPE 1 sends a multicast stream to the tail node device R1. Because a value obtained after a bitwise AND operation is performed on the BSM=000000010 and the bit string=00001011 is 000000010, the intermediate node device UPE 1 sends a multicast stream to the tail node device R2. Because a value obtained after a bitwise AND operation is performed on the BSM=000000100 and the bit string=00001011 is 00000100, the intermediate node device UPE 1 does not send a multicast stream to the tail node device R3. Because a value obtained after a bitwise AND operation is performed on the BSM=000001000 and the bit string=00001011 is 000001000, the intermediate node device UPE 1 sends a multicast stream to the tail node device R254.

The method in the embodiments of this application is described above in detail, and apparatuses in the embodiments of this application are provided below.

Figure 8:
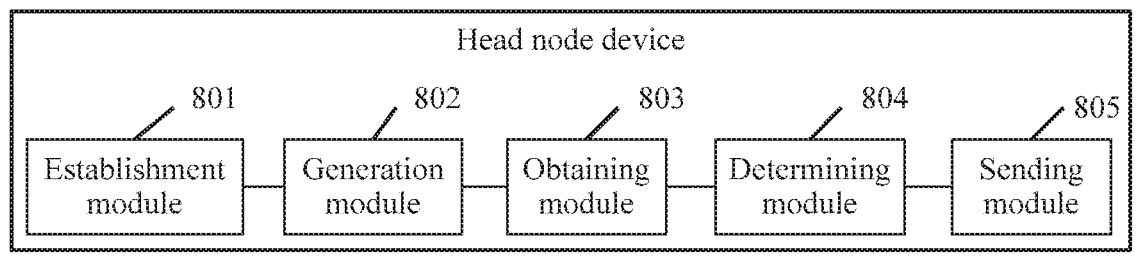
FIG. 8 is a schematic structural diagram of a head node device according to an embodiment of this application.

FIG. 8 is a schematic structural diagram of a head node device according to an embodiment of this application. The head node device may be a processor, for example, may include an establishment module 801, a generation module 802, an obtaining module 803, a determining module 804, and a sending module 805. Detailed descriptions of each module are as follows.

The establishment module 801 is configured to establish a first tunnel. A source node of the first tunnel is the head node device, a destination node of the first tunnel is the at least one tail node device, the first tunnel is used to forward a plurality of multicast streams, and the plurality of multicast streams include a first multicast stream.

The generation module 802 is configured to generate a first entry. The first entry includes first bit string map information, the first bit string map information includes an identifier of a first tail node device that is not directly connected to the head node device, and the at least one tail node device includes the first tail node device.

The obtaining module 803 is configured to obtain bit string information of the first multicast stream. The bit string information includes an identifier of a tail node device that the first multicast stream is expected to reach.

The determining module 804 is configured to determine whether the first bit string map information includes the identifier, in the bit string information, of the tail node device that the first multicast stream is expected to reach.

The sending module 805 is configured to forward the first multicast stream to a first intermediate node device through the first tunnel when the determining module 804 determines that the first bit string map information includes the identifier, in the bit string information, of the tail node device that the first multicast stream is expected to reach.

Optionally, the determining module 804 is configured to obtain a first operation result based on the bit string information and the first bit string map information, where a value of the first operation result is equal to a value obtained by performing a bitwise AND operation on the bit string information and the first bit string map information.

Optionally, when the determining module 804 determines that the first operation result is not 0, the sending module 805 is configured to forward the first multicast stream to the first intermediate node device through the first tunnel.

The first entry further includes first out interface information and first out label information, the first out interface information is used to indicate a physical out interface of the head node device, and the first out label information is used to indicate the first tunnel.

Optionally, the determining module 804 is further configured to determine, based on the first out interface information and the first out label information, the physical out interface indicated by the first out interface information, and send the first multicast stream through the first tunnel.

A multicast network further includes a second intermediate node device. The establishment module 801 is further configured to establish a second tunnel. A source node of the second tunnel is the head node device, a destination node of the second tunnel is the at least one tail node device, the second tunnel is used to forward the plurality of multicast streams, and the plurality of multicast streams include a second multicast stream. When the determining module 804 determines that bandwidth usage of the first tunnel is greater than the first threshold, the sending module 805 is further configured to forward the second multicast stream to the second intermediate node device through the second tunnel.

The generation module 802 is further configured to generate a second entry. The second entry includes second bit string map information, second out interface information, and second out label information, the second bit string map information includes an identifier of a second tail node device that is directly connected to the head node device, the at least one tail node device includes the second tail node device, the second out interface information is different from the first out interface information, both the second out label information and the first out label information correspond to an identifier of the first tunnel.

The determining module 804 is further configured to determine whether the second bit string map information includes the identifier, in the bit string information, of the tail node device that the first multicast stream is expected to reach.

The sending module 805 is further configured to forward the first multicast stream to the second tail node device through the first tunnel when the determining module 804 determines that the second bit string map information includes the identifier, in the bit string information, of the tail node device that the first multicast stream is expected to reach.

Optionally, the determining module 804 is further configured to discard the first multicast stream when the determining module 804 determines that the first bit string map information does not include the identifier, in the bit string information, of the tail node device that the first multicast stream is expected to reach.

It should be noted that for implementation of a specific function of each module, refer to corresponding descriptions of the head node device in the method embodiment shown in FIG. 2, to perform the method and functions that are performed in the foregoing embodiment.

Figure 9:
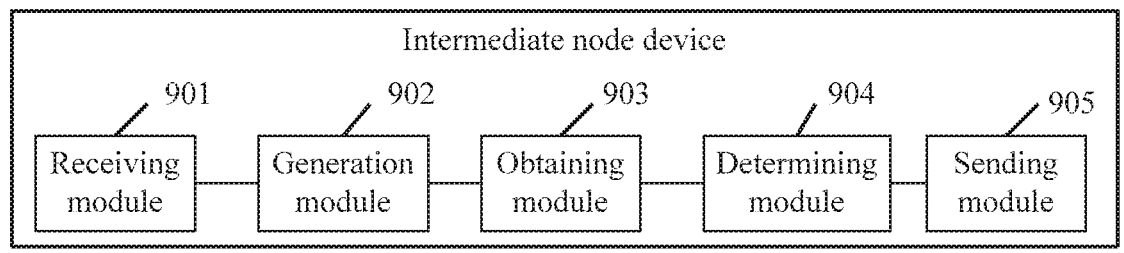
FIG. 9 is a schematic structural diagram of an intermediate node device according to an embodiment of this application.

FIG. 9 is a schematic structural diagram of an intermediate node device according to an embodiment of this application. The intermediate node device may be a processor, for example, may include a receiving module 901, a generation module 902, an obtaining module 903, a determining module 904, and a sending module 905. Detailed descriptions of each module are as follows.

The receiving module 901 is configured to receive, through a first tunnel, a first multicast stream sent by the head node device. A source node of the first tunnel is the head node device, a destination node of the first tunnel is the at least one tail node device, the first tunnel is used to forward a plurality of multicast streams, and the plurality of multicast streams include the first multicast stream.

The generation module 902 is configured to generate a first entry. The first entry includes first bit string map information, and the first bit string map information includes an identifier of a first tail node device that is directly connected to the intermediate node device.

The obtaining module 903 is configured to obtain bit string information included in the first multicast stream. The bit string information includes an identifier of a tail node device that the first multicast stream is expected to reach.

The determining module 904 is configured to determine whether the first bit string map information includes the identifier, in the bit string information, of the tail node device that the first multicast stream is expected to reach.

The sending module 905 is configured to forward the first multicast stream to the first tail node device through the first tunnel when the determining module 904 determines that the first bit string map information includes the identifier, in the bit string information, of the tail node device that the first multicast stream is expected to reach.

Optionally, the determining module 904 is configured to obtain a first operation result based on the bit string information and the first bit string map information. A value of the first operation result is equal to a value obtained by performing a bitwise AND operation on the bit string information and the first bit string map information.

The first entry further includes first out interface information and first out label information, the first out interface information is used to indicate a physical out interface of the intermediate node device, and the first out label information is used to indicate the first tunnel.

The determining module 904 is further configured to determine, based on the first out interface information and the first out label information, the physical out interface indicated by the first out interface information, and send the first multicast stream through the first tunnel.

The generation module 902 is further configured to generate a second entry. The second entry includes second bit string map information, second out interface information, and second out label information, the second bit string map information includes an identifier of a second tail node device that is directly connected to the intermediate node device, the at least one tail node device includes the second tail node device, the second out interface information is different from the first out interface information, both the second out label information and the first out label information correspond to an identifier of the first tunnel.

The determining module 904 is further configured to determine whether the second bit string map information includes the identifier, in the bit string information, of the tail node device that the first multicast stream is expected to reach.

The sending module 905 is further configured to forward the first multicast stream to the second tail node device through the first tunnel when the determining module 904 determines that the second bit string map information includes the identifier, in the bit string information, of the tail node device that the first multicast stream is expected to reach.

It should be noted that, for implementation of a specific function of each module, refer to corresponding descriptions of the intermediate node device in the method embodiment shown in FIG. 2, to perform the method and functions that are performed in the foregoing embodiment.

Figure 10:
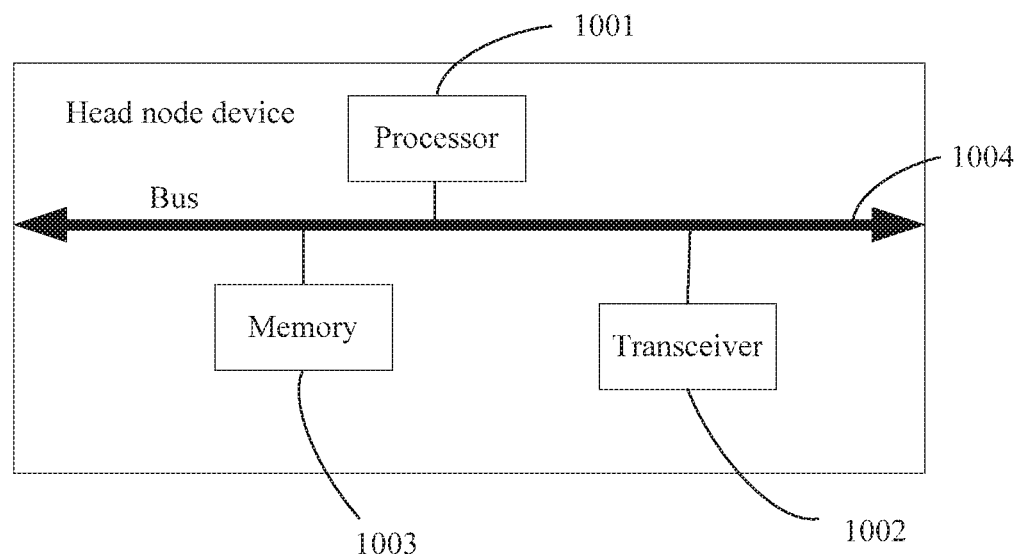
FIG. 10 is a schematic structural diagram of another head node device according to an embodiment of this application.

FIG. 10 is a schematic structural diagram of a head node device according to this application. The device may include at least one processor 1001, at least one communications interface 1002, at least one memory 1003, and at least one communications bus 1004. The communications bus 1004 is configured to implement connection and communication between these components. The communications interface 1002 of the device in this embodiment of this application is configured to perform signaling or data communication with another node device. The memory 1003 may be a high-speed random-access memory (RAM) memory, or may be a non-volatile memory (non-volatile memory), for example, at least one magnetic disk storage. Optionally, the memory 1003 may be at least one storage apparatus located far away from the processor 1001. The memory 1003 stores a set of program code, and may be further configured to store temporary data of the processor 1001, for example, intermediate operation data. The processor 1001 executes the program code in the memory 1003 to implement the method mentioned in the foregoing embodiment. For details, refer to the descriptions in the foregoing embodiment. Further, the processor 1001 may coordinate with the memory 1003 and the communications interface 1002, to perform the operations of the head node device in the foregoing embodiment of this application. The processor 1001 may include a processor executing the program code, such as a central processing unit (CPU) or a digital signal processor (DSP).

It may be understood that the memory 1003 may store no program code. In this case, the processor 1001 may include a hardware processor that does not need to execute program code, such as an application-specific integrated circuit (ASIC), a field programmable gate array (FPGA), or a hardware accelerator formed by an integrated circuit. In this case, the memory 1003 may be only configured to store temporary data of the processor 1001, for example, intermediate operation data.

Figure 11:
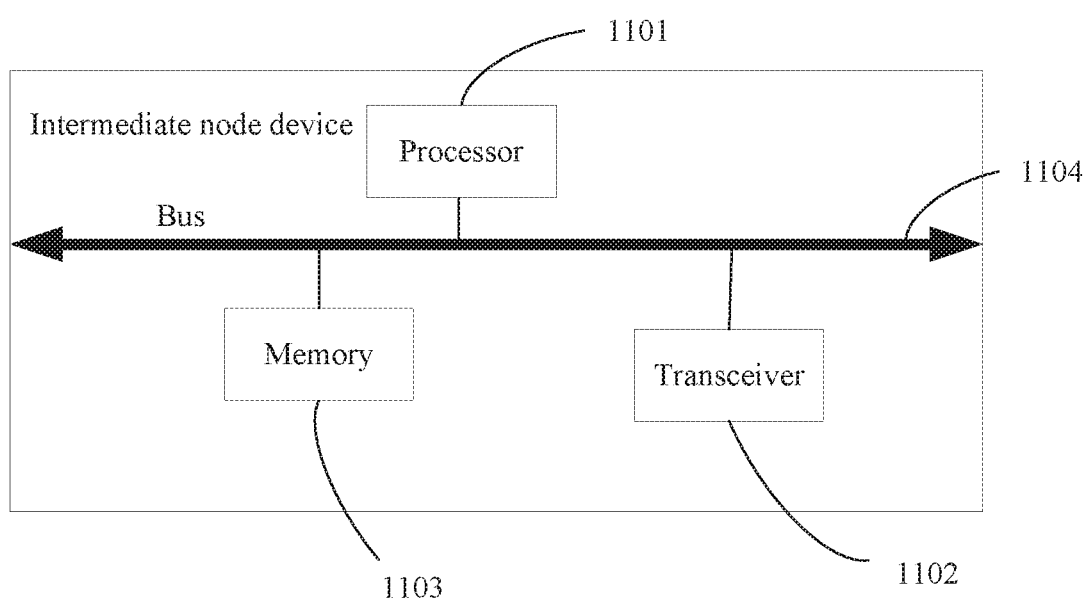
FIG. 11 is a schematic structural diagram of another intermediate node device according to an embodiment of this application.

FIG. 11 is a schematic structural diagram of an intermediate node device according to this application. The device may include at least one processor 1101, at least one communications interface 1102, at least one memory 1103, and at least one communications bus 1104. The communications bus 1104 is configured to implement connection and communication between these components. The communications interface 1102 of the device in this embodiment of this application is configured to perform signaling or data communication with another node device. The memory 1103 may be a high-speed RAM memory, or may be a non-volatile memory (non-volatile memory), for example, at least one magnetic disk storage. Optionally, the memory 1103 may be at least one storage apparatus located far away from the processor 1101. The memory 1103 stores a set of program code, and may be further configured to store temporary data of the processor 1101, for example, intermediate operation data. The processor 1101 executes the program code in the memory 1103 to implement the method mentioned in the foregoing embodiment. For details, refer to the descriptions in the foregoing embodiment. Further, the processor 1101 may coordinate with the memory 1103 and the communications interface 1102, to perform the operations of the intermediate node device in the foregoing embodiment of this application. The processor 1101 may specifically include a processor executing the program code, such as a CPU or a DSP.

It may be understood that the memory 1103 may store no program code. In this case, the processor 1101 may include a hardware processor that does not need to execute program code, such as an ASIC, a FPGA, or a hardware accelerator formed by an integrated circuit. In this case, the memory 1103 may be only configured to store temporary data of the processor 1101, for example, intermediate operation data.

All or some of the functions of the methods in the foregoing embodiments may be implemented using software, hardware, firmware, or any combination thereof. When software is used to implement the embodiments, the embodiments may be implemented partially in a form of a computer program product. The computer program product includes one or more computer instructions. When the computer program instructions are loaded and executed on a computer or a processor inside the computer, all or some of the procedures or functions in the embodiments of this application are generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (such as a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD), or the like.

What is claimed is:

1. A multicast forwarding method implemented by a head node device in a bit index explicit replication (BIER) multicast network, wherein the multicast forwarding method comprises:
   establishing a first tunnel, wherein the head node device is a source node of the first tunnel, wherein at least one tail node device of the BIER multicast network is a destination node of the first tunnel, and wherein the first tunnel forwards a plurality of multicast streams comprising a first multicast stream;
   generating a first entry, wherein the first entry comprises first bit string map information, wherein the first bit string map information comprises a first identifier of a first tail node device that is not directly connected to the head node device, and wherein the at least one tail node device comprises the first tail node device;
   obtaining bit string information of the first multicast stream, wherein the bit string information comprises a second identifier of a second tail node device of the at least one tail node device that the first multicast stream is expected to reach;
   determining whether the first bit string map information comprises the second identifier, in the bit string information, of the second tail node device that the first multicast stream is expected to reach; and
   forwarding, by the head node device, the first multicast stream to a first intermediate node device of the BIER multicast network through the first tunnel when the head node device determines that the first bit string map information comprises the second identifier, in the bit string information, of the second tail node device that the first multicast stream is expected to reach.

2. The multicast forwarding method of claim 1, further comprising:
   performing a bitwise AND operation on the bit string information and the first bit string map information to obtain a value; and
   obtaining, by the head node device, a first operation result based on the bit string information and the first bit string map information, wherein the first operation result is equal to the value.

3. The multicast forwarding method of claim 2, further comprising:
   determining, by the head node device, the first operation result; and
   forwarding, by the head node device, the first multicast stream to the first intermediate node device through the first tunnel when the head node device determines that the first operation result is not 0.

4. The multicast forwarding method of claim 1, wherein the first entry further comprises first out interface information and first out label information, wherein the first out interface information indicates a physical out interface of the head node device, wherein the first out label information indicates the first tunnel, and wherein the multicast forwarding method further comprises:
   determining, by the head node device based on the first out interface information and the first out label information, the physical out interface; and
   sending, by the head node device, the first multicast stream through the first tunnel.

5. The multicast forwarding method of claim 4, further comprising generating, by the head node device, a second entry, wherein the second entry comprises second bit string map information, second out interface information, and second out label information, wherein the second bit string map information comprises a third identifier of a third tail node device that is directly coupled to the head node device, wherein the at least one tail node device comprises the third tail node device, wherein the second out label information and the first out label information correspond to an identifier of the first tunnel, and wherein the multicast forwarding method further comprises:
   determining, by the head node device, whether the second bit string map information comprises the second identifier of the second tail node device that the first multicast stream is expected to reach; and
   forwarding, by the head node device, the first multicast stream to the third tail node device through the first tunnel when the head node device determines that the second bit string map information comprises the second identifier of the second tail node device that the first multicast stream is expected to reach.

6. The multicast forwarding method of to claim 1, wherein the multicast network further comprises a second intermediate node device, and wherein the multicast forwarding method further comprises:
establishing, by the head node device, a second tunnel, wherein the head node device is a source node of the second tunnel, wherein the at least one tail node device is a destination node of the second tunnel, and wherein the multicast streams comprising a second multicast stream are forwarded through the second tunnel;
determining, by the head node device, a bandwidth usage of the first tunnel; and
forwarding, by the head node device, the second multicast stream to the second intermediate node device through the second tunnel when the bandwidth usage of the first tunnel is greater than a first threshold.

7. The multicast forwarding method of claim 1, further comprising
discarding, by the head node device, the first multicast stream when the first bit string map information does not comprise the second identifier of the second tail node device that the first multicast stream is expected to reach.

8. A head node device in a bit index explicit replication (BIER) multicast network, comprising:
a non-transitory memory storing instructions; and
a processor coupled to the non-transitory memory and configured to execute the instructions, wherein the instructions that when executed by the processor, cause the head node device to be configured to:
establish a first tunnel to at least one tail node device, wherein the head node device is a source node of the first tunnel, wherein at least one tail node device in the BIER multicast network is a destination node of the first tunnel, and wherein the first tunnel is used to forward a plurality of multicast streams comprising a first multicast stream;
generate a first entry, wherein the first entry comprises first bit string map information, wherein the first bit string map information comprises a first identifier of a first tail node device that is not directly connected to the head node device, and wherein the at least one tail node device comprises the first tail node device;
obtain bit string information of the first multicast stream, wherein the bit string information comprises a second identifier of a second tail node device that the first multicast stream is expected to reach;
determine whether the first bit string map information comprises the second identifier, in the bit string information, of the second tail node device that the first multicast stream is expected to reach; and
forward the first multicast stream to a first intermediate node device in the BIER multicast network through the first tunnel when the head node device determines that the first bit string map information comprises the second identifier, in the bit string information, of the second tail node device that the first multicast stream is expected to reach.

9. The head node device of claim 8, wherein the instructions further cause the head node device to be configured to:
perform a bitwise AND operation on the bit string information and the first bit string map information to obtain a value; and
obtain a first operation result based on the bit string information and the first bit string map information, wherein the first operation result is equal to the value.

10. The head node device of claim 9, wherein the instructions further cause the head node device to be configured to:
determine the first operation result; and
forward the first multicast stream to the first intermediate node device through the first tunnel when determining that the first operation result is not 0.

11. The head node device of claim 8, further comprising a physical out interface, wherein the first entry further comprises first out interface information and first out label information, wherein the first out interface information indicates the physical out interface, wherein the first out label information indicates the first tunnel, and wherein the instructions further cause the head node device to be configured to:
determine, based on the first out interface information and the first out label information, the physical out interface; and
send the first multicast stream through the first tunnel.

12. The head node device of claim 11, wherein the instructions further cause the head node device to be configured to:
generate a second entry, wherein the second entry comprises second bit string map information, second out interface information, and second out label information, wherein the second bit string map information comprises a third identifier of a third tail node device that is directly coupled to the head node device, wherein the at least one tail node device comprises the third tail node device, wherein the second out label information and the first out label information correspond to an identifier of the first tunnel, and wherein the instructions further cause the head node device to be configured to:
determine whether the second bit string map information comprises the second identifier, in the bit string information, of the second tail node device that the first multicast stream is expected to reach; and
forward the first multicast stream to the third tail node device through the first tunnel when the second bit string map information comprises the second identifier of the second tail node device that the first multicast stream is expected to reach.

13. The head node device of claim 8, wherein the instructions further cause the head node device to be configured to:
establish a second tunnel, wherein the head node device is a source node of the second tunnel, wherein the at least one tail node device is a destination node of the second tunnel, and wherein the multicast streams comprising a second multicast stream is forwarded through the second tunnel;
determine a bandwidth usage of the first tunnel; and
forward the second multicast stream to a second intermediate node device in the BIER multicast network through the second tunnel when the bandwidth usage of the first tunnel is greater than a first threshold.

14. The head node device of claim 8, wherein the instructions further cause the head node device to be configured to
discard the first multicast stream when the head node device determines that the first bit string map information does not comprise the second identifier of the second tail node device that the first multicast stream is expected to reach.

* * * * *